US010146483B2

United States Patent
Nishino et al.

(10) Patent No.: US 10,146,483 B2
(45) Date of Patent: Dec. 4, 2018

(54) MEMORY SYSTEM

(71) Applicant: Toshiba Memory Corporation, Minato-ku (JP)

(72) Inventors: Reina Nishino, Yokohama (JP); Kenichi Maeda, Kamakura (JP); Kenji Funaoka, Kawasaki (JP); Nobuhiro Kondo, Yokohama (JP); Toshio Fujisawa, Yokohama (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 141 days.

(21) Appl. No.: 15/254,571

(22) Filed: Sep. 1, 2016

(65) Prior Publication Data
US 2017/0249247 A1 Aug. 31, 2017

Related U.S. Application Data

(60) Provisional application No. 62/301,101, filed on Feb. 29, 2016.

(51) Int. Cl.
G06F 12/0804 (2016.01)
G06F 3/06 (2006.01)
G06F 12/0868 (2016.01)
G06F 9/4401 (2018.01)
G06F 12/0897 (2016.01)

(52) U.S. Cl.
CPC .......... *G06F 3/0685* (2013.01); *G06F 3/0619* (2013.01); *G06F 3/0634* (2013.01); *G06F 3/0647* (2013.01); *G06F 9/4418* (2013.01); *G06F 12/0868* (2013.01); *G06F 12/0897* (2013.01); *G06F 2212/1028* (2013.01);
(Continued)

(58) Field of Classification Search
CPC ................. G06F 3/0619; G06F 3/0685; G06F 2212/205; G06F 12/0868; G06F 2212/1028; G06F 2212/222; G06F 2212/312; G06F 2212/7203; G06F 3/0634; G06F 3/0647;
(Continued)

(56) References Cited

U.S. PATENT DOCUMENTS 8,213,255 B2  7/2012  Hemink et al.
8,385,117 B2  2/2013  Sakurada et al.
(Continued)

FOREIGN PATENT DOCUMENTS

JP  2010-165426  7/2010
JP  2011-18241  1/2011
(Continued)

*Primary Examiner* — Hashem Farrokh
(74) *Attorney, Agent, or Firm* — Oblon, McClelland, Maier & Neustadt, L.L.P.

(57) ABSTRACT

According to one embodiment, a memory system is connectable to a host including a first memory. The memory system includes a non-volatile second memory, a volatile third memory, and a controller. The controller uses the third memory as a work memory, and executes data transfer between the host and the second memory. The controller receives a first command to change a power mode from the host. The controller transfers first data to the first memory and transfers second data to the second memory in response to the receipt of the first command. The controller transmits a response of completion of data transfer. The first data and the second data are included in third data. The third data is data in the third memory.

20 Claims, 12 Drawing Sheets

(52) U.S. Cl.
CPC ........ *G06F 2212/1032* (2013.01); *G06F 2212/205* (2013.01); *G06F 2212/222* (2013.01); *G06F 2212/283* (2013.01); *G06F 2212/311* (2013.01); *G06F 2212/312* (2013.01); *G06F 2212/7203* (2013.01)

(58) Field of Classification Search
CPC ......... G06F 12/0897; G06F 2212/1032; G06F 2212/311; G06F 3/0653
See application file for complete search history.

(56) References Cited

U.S. PATENT DOCUMENTS

| | | | |
|---|---|---|---|
| 2011/0010582 A1 | 1/2011 | Tsukamoto et al. | |
| 2011/0307724 A1* | 12/2011 | Shaw | G06F 21/305 713/323 |
| 2013/0151755 A1* | 6/2013 | Elhamias | G06F 12/0246 711/103 |
| 2013/0219108 A1 | 8/2013 | Yang et al. | |
| 2013/0290647 A1 | 10/2013 | Maeda et al. | |
| 2014/0068281 A1* | 3/2014 | Diamant | G06F 1/3268 713/300 |
| 2015/0012671 A1* | 1/2015 | Park | G06F 1/3268 710/5 |
| 2015/0193160 A1* | 7/2015 | Li | G06F 17/30159 711/162 |
| 2017/0123721 A1* | 5/2017 | Sela | G06F 3/0656 |

FOREIGN PATENT DOCUMENTS

| | | |
|---|---|---|
| JP | 2012-181761 | 9/2012 |
| JP | 2013-520760 | 6/2013 |

* cited by examiner

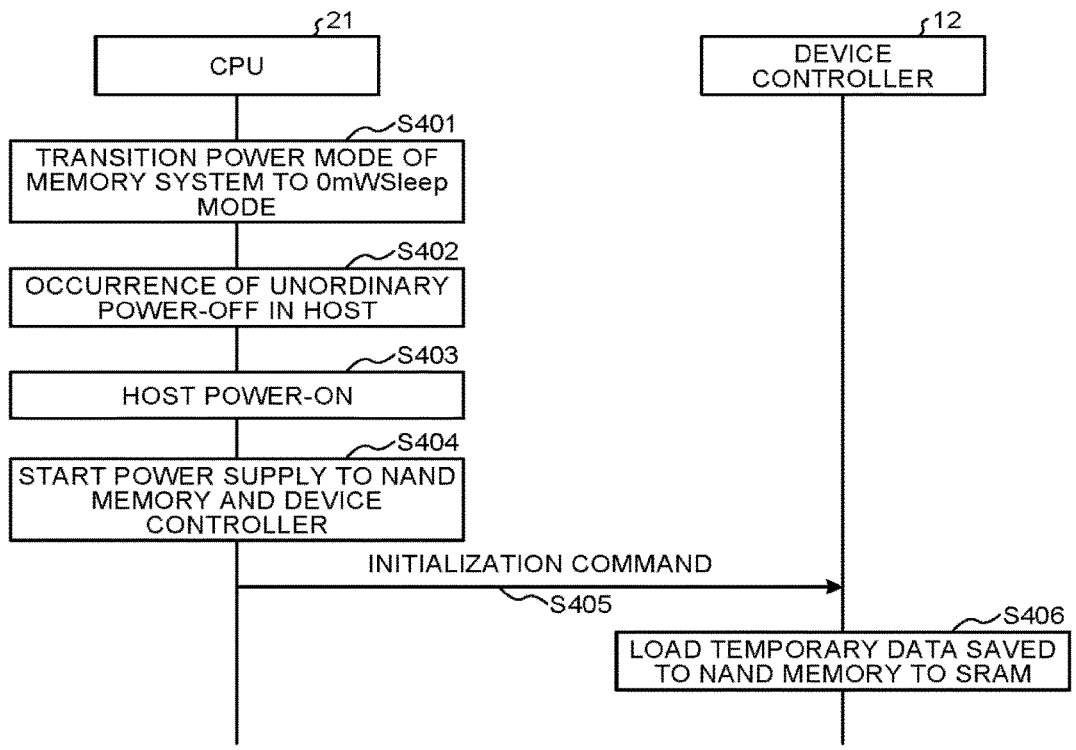

MEMORY SYSTEM

CROSS-REFERENCE TO RELATED APPLICATIONS

This application is based upon and claims the benefit of priority from U.S. Provisional Application No. 62/301,101, filed on Feb. 29, 2016; the entire contents of which are incorporated herein by reference.

FIELD

Embodiments described herein relate generally to a memory system.

BACKGROUND

Conventionally, as memory architecture of an information processing apparatus, unified memory architecture (UMA) is known. The UMA is memory architecture in which a memory mounted on a host is shared by the host and a device. According to the UMA, a decrease in memory cost can be achieved.

BRIEF DESCRIPTION OF THE DRAWINGS

FIG. 7 is a sequence diagram illustrating an operation of the memory system of the first embodiment of when unordinary power-off occurs in a host while the power mode of the memory system is the 0mWSleep mode;

FIG. 8 is a diagram illustrating an example of a table for search for a saving destination;

DETAILED DESCRIPTION

In general, according to one embodiment, a memory system is connectable to a host including a first memory. The memory system includes a non-volatile second memory, a volatile third memory, and a controller. The controller uses the third memory as a work memory, and executes data transfer between the host and the second memory. The controller receives a first command to change a power mode from the host. The controller transfers first data to the first memory and transfers second data to the second memory in response to the receipt of the first command. The controller transmits a response of completion of data transfer. The first data and the second data are included in third data. The third data is data in the third memory.

Exemplary embodiments of the memory system will be explained below in detail with reference to the accompanying drawings. The present invention is not limited to the following embodiments.

First Embodiment

Figure 1:
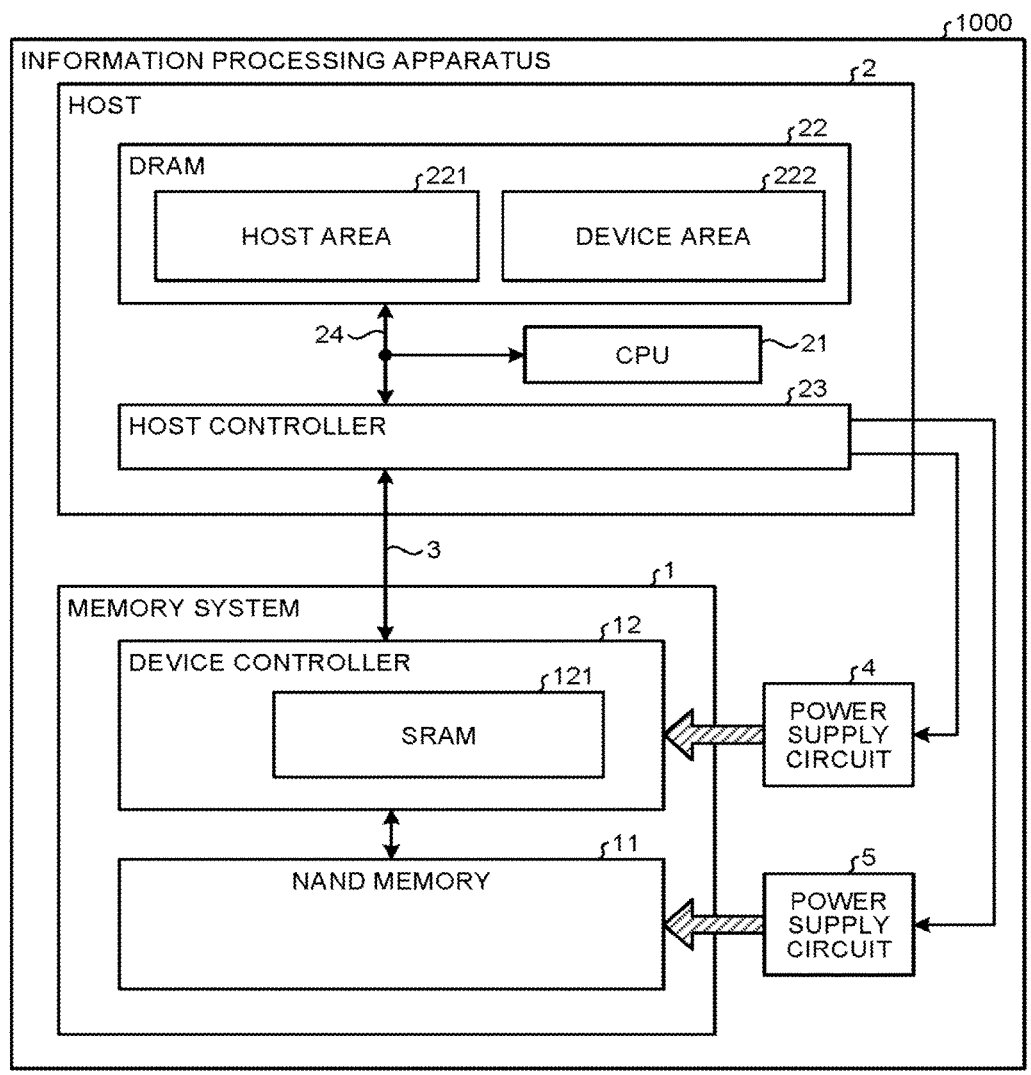
FIG. 1 is a diagram illustrating a configuration example of an information processing apparatus to which a memory system of a first embodiment is applied.

FIG. 1 is a diagram illustrating a configuration example of an information processing apparatus to which a memory system of a first embodiment is applied. An information processing apparatus 1000 includes a host 2 and a memory system 1 that functions as an external storage device of the host 2. The host 2 and the memory system 1 are connected with a communication path 3. As memory architecture of the information processing apparatus, UMA is employed.

The information processing apparatus 1000 is a server, a personal computer, a mobile phone, an imaging device, or the like. As a standard that the memory system 1 conforms to and a standard of the communication path 3, arbitrary standards can be employed. For example, the memory system 1 is a flash memory conforming to a universal flash storage (UFS) standard. As the communication standard of the communication path 3, a mobile industry processor interface (MIPI) M-PHY can be employed.

The memory system 1 includes a NAND-type flash memory (NAND memory) 11 as a non-volatile memory and a device controller 12. Note that, as the non-volatile memory of the memory system 1, types of memories other than the NAND-type flash memory can be employed. For example, a magnetoresistive random access memory (MRAM), a resistive random access memory (ReRAM), a NOR-type flash memory, or the like can be employed as the non-volatile memory.

The NAND memory 11 stores user data transmitted from the host 2. The user data includes, for example, an operating system that provides a user with an execution environment of the host 2, a user program executed on an OS by the host 2, or data input/output by the OS or the user program.

The device controller 12 executes control of the memory system 1 including transfer of data between the host 2 and the NAND memory 11.

As a hardware configuration of the device controller 12, arbitrary configuration can be employed as long as the configuration can execute control. The device controller 12 includes a processing device such as a central processing unit (CPU), for example. The processing device realizes control of the device controller 12 by executing a firmware program. The firmware program is stored in the NAND memory 11, for example, in advance. A program code of the firmware program is loaded onto a static random access memory (SRAM) 121 described below from the NAND memory 11 at the time of boot. The calculation device executes control by executing the program code in the SRAM.

Alternatively, the device controller 12 may include a direct memory access controller (DMAC). The device controller 12 may be configured from a hardware circuit that does not require a program. The device controller 12 may be configured from a combination of a calculation device and a hardware circuit that does not require a program. That is, the hardware configuration of the device controller 12 is not limited to a specific configuration.

The device controller 12 includes an SRAM 121 that is a volatile memory. The SRAM 121 is used by the device controller 12 as a work memory for control. As the volatile memory of the device controller 12, arbitrary types of memories other than the SRAM can be employed. For example, a dynamic random access memory (DRAM) can be employed as the volatile memory of the device controller 12.

The device controller 12 stores data having a characteristic of being updated, data having a characteristic of being frequently read although not being updated, data having a characteristic of being necessarily read at a high speed, and the like to the SRAM 121 as temporary data (temporary data 6). The device controller 12 then can use the temporary data 6 in the SRAM 121. For example, the temporary data 6 includes the program code that configures the firmware program, statistical information regarding an operation of the memory system 1, a translation table, the user data, configuration information of the memory system 1, and the like.

The translation table is information in which correspondence between locations in an address space, the locations being allocated by the host 2 to the memory system 1, and physical locations in the NAND memory 11 are recorded. The information that indicates the locations in the address space is also called logical addresses, and is written in a logical block address (LBA), for example. The host 2 uses the logical address as information that indicates a location of an access destination in a write command and a read command.

For example, a main body of the translation table is stored in the NAND memory 11. The device controller 12 loads a part or the whole of the translation table from the NAND memory 11 to the SRAM 121, and uses the translation table loaded to the SRAM 121. Use of the translation table includes referring to the translation table, updating the translation table, or both of them. The device controller 12 writes an updated portion of the translation table to the NAND memory 11 at predetermined timing in a case where the translation table in the SRAM 121 has been updated, and regards a portion before the update of the translation table in the NAND memory 11 as invalid. An area in the SRAM 121, to which the translation table is loaded, may have a structure of a cache or a structure of a buffer such as a FIFO. Further, the translation table may be hierarchized into a plurality of layers. A specified layer of the translation table made of the plurality of layers may be stored in the SRAM 121.

Note that the information used by the host 2 to specify a location is not limited to the logical address. For example, the memory system 1 may be configured to be able to store data according to a Key-Value Store (KVS). In this case, the host 2 specifies a key for writing and reading data. The memory system 1 manages a translation table in which correspondence between the key and a physical location in the NAND memory is recorded.

Further, for example, the device controller 12 first writes, to the SRAM 121, user data which is transmitted from the host 2 together with the write command. Then the device controller 12 writes the user data in the SRAM 121 to the NAND memory 11 at predetermined timing. When writing the user data to the NAND memory 11, the device controller 12 updates the translation table. An area in the SRAM 121, to which the user data is written, may have a structure of a cache or a structure of a buffer such as a FIFO. When the user data written in the SRAM 121 becomes a target to be read by the read command, the device controller 12 may transmit the user data in the SRAM 121 to the host 2.

Further, for example, the device controller 12 stores the statistical information regarding an operation of the memory system 1 to the SRAM 121. The statistical information is the number of times of arbitrary operations. For example, the statistical information includes the number of times of power on, the number of times of occurrence of errors, a power-on hours, the number of received commands, and the like. The statistical information may be the number of times of operations based on arbitrary timing. For example, the statistical information is the number of times of operations after shipment.

The configuration information of the memory system 1 is a value unique to the own memory system 1. The configuration information of the memory system 1 includes, for example, a user capacity, a physical capacity, the number of operation clocks, a model number, and the like. For example, the firmware program includes a portion regarding the configuration information as a variable so as to be operable in any memory system 1, and the device controller 12 uses the configuration information of the memory system 1 in executing the firmware program. The configuration information of the memory system 1 is stored in the NAND memory 11 in advance, and the device controller 12 reads the configuration information of the memory system 1 from the NAND memory 11 to the SRAM 121 at the time of boot. The device controller 12 then uses the configuration information in the SRAM 121.

Note that the device controller 12 may include a register. In the register, data before calculation, data after calculation, intermediate data of calculation, and the like. The register is included in the concept of the volatile memory of the embodiments. That is, the data stored in the register is included in the concept of the temporary data 6 of the embodiments.

The host 2 includes a CPU 21, a dynamic random access memory (DRAM) 22, and a host controller 23. The CPU 21, the DRAM 22, and the host controller 23 are mutually connected with a bus 24.

The CPU 21 executes the OS and the user program while using the DRAM 22 (to be specific, a host area 221 described below) as a work memory. For example, the host 2 uses the host area 221 as an area to which the programs (the OS and the user program) are loaded and an area in which data generated or updated in executing the programs. The CPU 21 can issue the write command for writing the data in the host area 221 to the memory system 1 and the read command for reading the data from the memory system 1 to the host area 221. Hereinafter, the write command and the read command may be collectively called access command.

The host controller 23 executes data transfer in response to the access command issued by the CPU 21. Further, according to the UMA, the device controller 12 can issue a command for accessing a device area 222 in the DRAM 22, and the host controller 23 executes data transfer in response to the command issued by the device controller 12. An example of the data transfer in response to the command issued by the device controller 12 will be described below.

The host controller 23 may include a processing device such as a CPU. The host controller 23 may include a direct memory access controller (DMAC). The host controller 23 may be configured from a hardware circuit that does not require a program. The host controller 23 may be configured from a combination of the calculation device and the hardware circuit that does not require a program. That is, the hardware configuration of the host controller 23 is not limited to a specific configuration.

The DRAM 22 functions as a main memory of the host 2. As the main memory of the host 2, a type of a memory other than the DRAM can be employed. The DRAM 22 includes the host area 221 and the device area 222. The host area 221 is the area used by the host 2 as a work memory, as described above.

The memory system 1 can use the device area 222 as a work memory similar to the SRAM 121. Further, the memory system 1 can use the device area 222 as a saving area of the temporary data 6 in the SRAM 121.

That is, the device controller 12 can, at least, write data to the device area 222 and read data in the device area 222. To be specific, the device controller 12 can issue a write command for storing data to the device area 222. The host controller 23 transfers the data from the device controller 12 to the device area 222 in response to the write command issued by the device controller 12. Further, the device controller 12 can issue a read command for reading the data from the device area 222. The host controller 23 transfers the data from the device area 222 to the device controller 12 in response to the read command issued by the device controller 12.

Further, when the user data is buffered or cached in the device area 222, the device controller 12 may issue a command that causes the host controller 23 to execute transfer of the user data between the host area 221 and the device area 222 in response to the access command from the CPU 21. The host controller 23 executes the transfer of the user data between the host area 221 and the device area 222 in response to the command from the device controller 12.

Note that processing by the CPU 21 may intervene in the data transfer in response to the command issued by the device controller 12. Further, the data transfer in response to the command issued by the device controller 12 may be executed by the CPU 21 instead of the device controller 12.

The information processing apparatus 1000 further includes a power supply circuit 4 and a power supply circuit 5. The hatched arrow illustrates power supply. The power supply circuit 4 is a circuit that generates power that drives the device controller 12. The device controller 12 is driven by the power supplied from the power supply circuit 4. The power supply circuit 5 is a circuit that generates power that drives the NAND memory 11. The NAND memory 11 is driven by the power supplied from the power supply circuit 5. The power supply circuit 4 and the power supply circuit 5 may generate the power from a battery (not illustrated). The power supply circuit 4 and the power supply circuit 5 may generate the power by converting power supplied from an outside.

The CPU 21 can instruct start and stop of the power supply to/from the device controller 12, and start and stop of the power supply to/from the NAND memory 11. The host controller 23 controls the power supply circuit 4 and the power supply circuit 5 based on the instruction from the CPU 21. That is, the CPU 21 can execute the start and stop of the power supply to/from the device controller 12, and the start and stop of the power supply to/from the NAND memory 11.

The CPU 21 can transfer the power mode of the memory system 1 into a 0mWSleep mode. The 0mWSleep mode is one of low power consumption modes, and is a power mode that can make power consumption of the memory system 1 nearly zero during an operation of the host 2. Here, as an example, in the 0mWSleep mode, both of the device controller 12 and the NAND memory 11 are stopped. In the 0mWSleep mode, both of the power supply circuit 4 and the power supply circuit 5 are kept to a state where the power supply is stopped.

Note that the control of the power mode may be realized by the host controller 23 instead of the CPU 21. Further, both of the CPU 21 and the host controller 23 may execute the control of the power mode. Further, the host 2 may include a special control unit for the control of the power mode. Here, as an example, description will be given on the assumption that the CPU 21 executes the control of the power mode based on the OS. Further, the start and stop of the power supply to the device controller 12 may be executed by the device controller 12. Further, the start and stop of the power supply to the NAND memory 11 may be executed by the device controller 12. Further, the power supply circuit 4 may be included in the memory system 1. Further, the power supply circuit 5 may be included in the memory system 1.

The CPU 21 issues a 0mWSleep transition command when changing the power mode of the memory system 1 into the 0mWSleep mode. The 0mWSleep transition command issued by the CPU 21 is transferred to the device controller 12 through the host controller 23. In the 0mWSleep mode, the power supply to the device controller 12 is stopped, and thus the temporary data cannot be continuously held in the SRAM 121. Therefore, the device controller 12 executes saving of the temporary data in the SRAM 121 upon receipt of the 0mWSleep transition command.

An outline of saving of the temporary data 6 will be described with reference to FIGS. 2 and 3.

Figure 2:
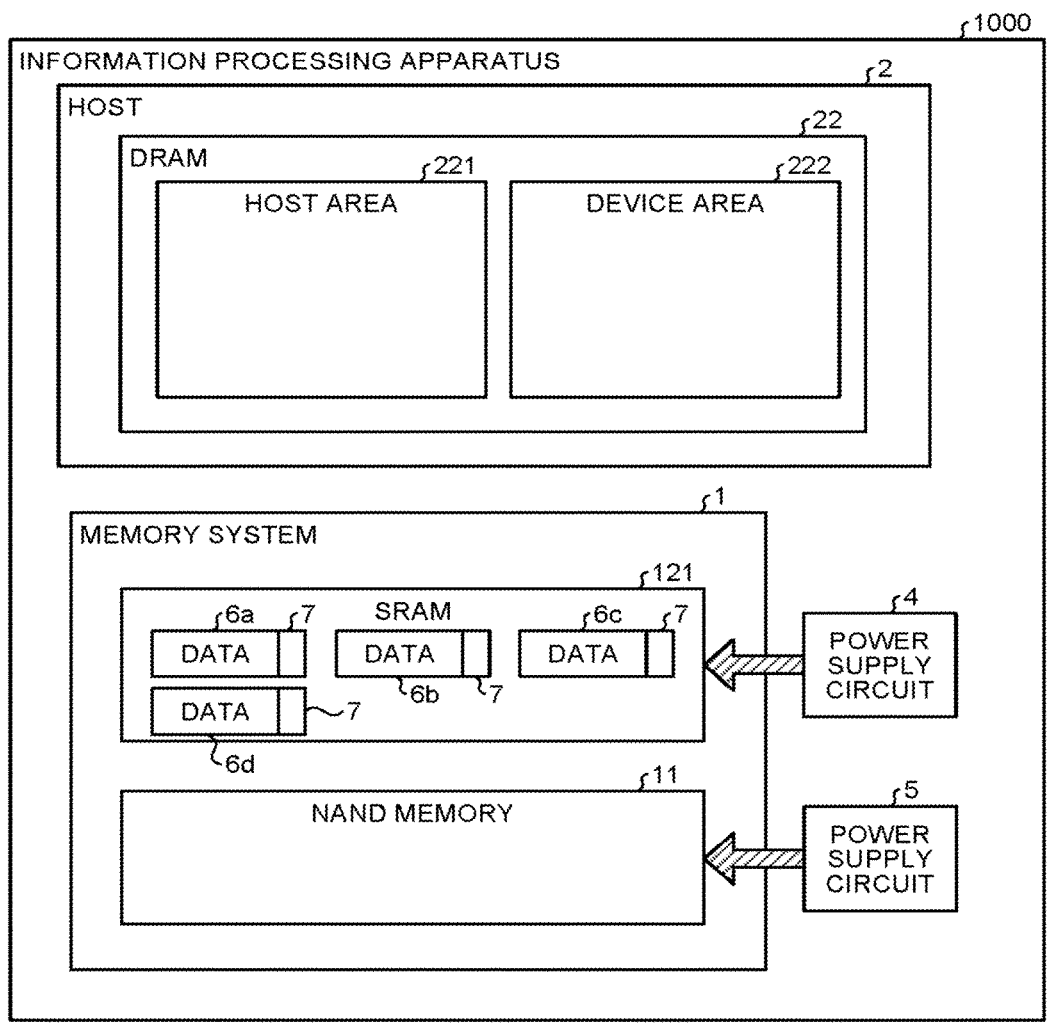
FIG. 2 illustrates a state of memories in a case where a power mode of the memory system is a normal operation mode.

FIG. 2 illustrates a state of memories in a case where the power mode of the memory system 1 is a normal operation mode. The normal operation mode includes a state where the access command from the host 2 is processable, a state where the access command from the host 2 is being in execution, and a state where internal processing (garbage collection, refresh, and the like) is in execution. In the normal operation mode, power is supplied to both of the device controller 12 and the NAND memory 11. In FIG. 2, four pieces of temporary data 6 (temporary data 6a, 6b, 6c, and 6d) are stored in the SRAM 121.

Figure 3:
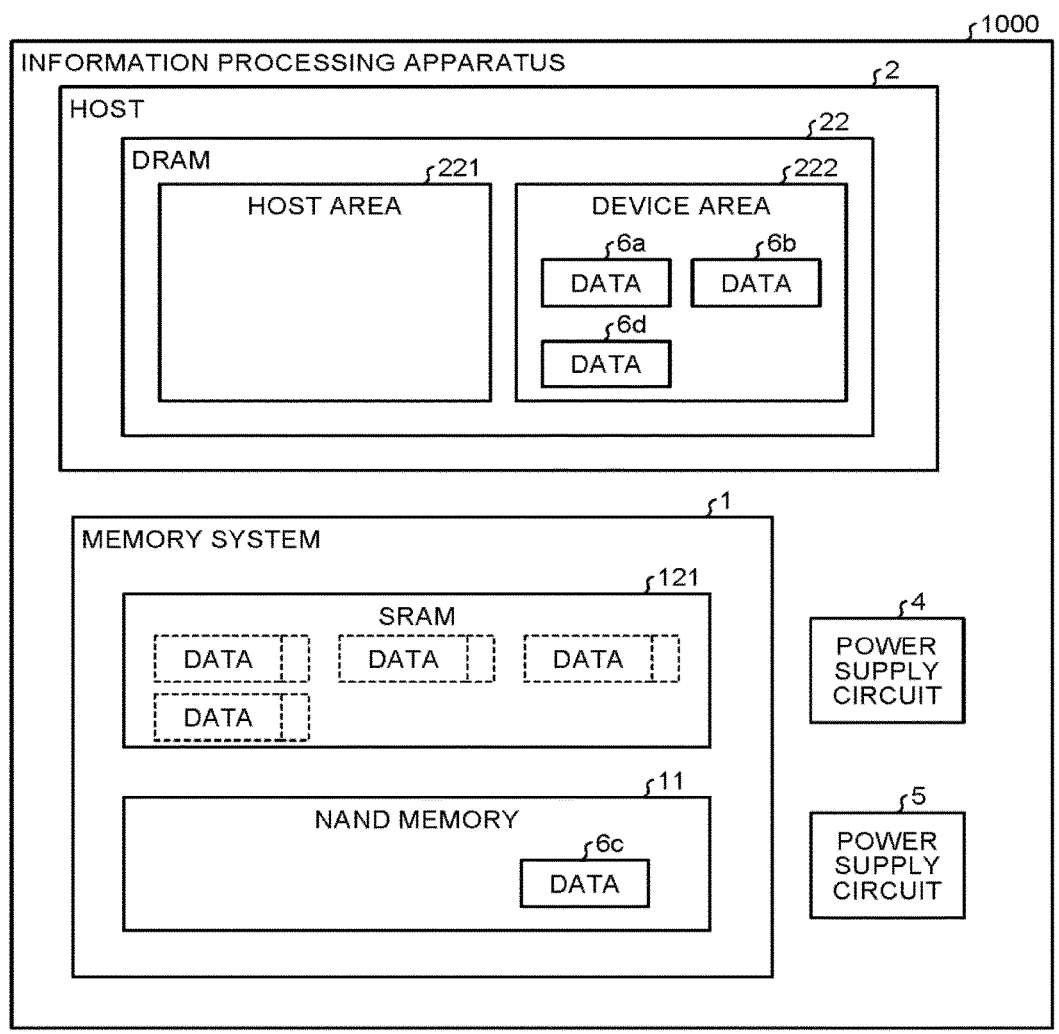
FIG. 3 illustrates a state of memories in a case where the power mode of the memory system is a 0mWSleep mode.

FIG. 3 illustrates a state of memories of when the power mode of the memory system 1 is the 0mWSleep mode. Three pieces of temporary data 6 (the temporary data 6a, 6b, and 6d) of the four pieces of temporary data 6 are saved to the device area 222, and one temporary data 6c of the four pieces of temporary data 6 is saved to the NAND memory 11. When the power mode is transitioned from the 0mWSleep mode to the normal operation mode, the device controller 12 loads the three temporary data 6 saved to the device area 222 and the one temporary data 6 saved to the NAND memory 11 to the SRAM 121. Accordingly, the device controller 12 can recover the state in the SRAM 121 to the state immediately before the mode is transitioned to the 0mWSleep mode.

As described above, the device controller 12 can save the temporary data 6 in the SRAM 121 to the device area 222 and the NAND memory 11. In the example of FIG. 3, it has been explained that the temporary data 6 can be saved to either the device area 222 or the NAND memory 11. However, the temporary data 6 may be saved to both of the device area 222 and the NAND memory 11. Note that saving data in the embodiments is included in the concept of transferring data. The temporary data 6 may not be deleted from the device area after the saving (transferring).

The temporary data 6 saved to the device area 222 is recovered faster than the temporary data 6 saved to the NAND memory 11. Further, the temporary data 6 saved to the device area 222 is lost from the device area 222 when unordinary power-off occurs in the host 2 when the power mode of the memory system 1 is the 0mWSleep mode. Meanwhile, the temporary data 6 saved to the NAND memory 11 is recoverable even when the unordinary power-off occurs in the host 2 when the power mode of the memory system 1 is the 0mWSleep mode.

The device controller 12 can select saving destinations of the temporary data 6. The device controller 12 adds attribute information 7 to the temporary data 6 as information that is used to select the saving destinations of the temporary data 6. The device controller 12 individually determines the saving destinations of the temporary data 6 based on information from the host 2 and the attribute information 7.

In the first embodiment, as an example, importance is employed as the attribute information 7. The importance is a numerical parameter that indicates the degree of importance. Further, as an example, as the information from the host 2, which is used to determine the saving destination, a high-speed resume level and a power-off handling level are employed. The high-speed resume level is a numerical parameter that indicates the degree of emphasizing high-speed recovery.

A case where the unordinary power-off occurs in the host 2 while the power mode of the memory system 1 is the 0mWSleep mode can be considered. The unordinary power-off is stop of the power supply to the host 2 where the OS of the host 2 does not execute an ordinary power-off sequence. The ordinary power-off sequence includes at least processing of non-volatilizing a part or all of data in the DRAM 22. That is, when the unordinary power-off occurs while the power mode of the memory system 1 is the 0mWSleep mode, the temporary data 6 saved in the device area 222 disappear and cannot be recovered. The power-off handling level is a numerical parameter that indicates the degree of emphasizing handling the unordinary power-off of the host 2.

The value of the importance becomes larger as data is more important. However, the relationship between the degree of importance of data and the value of the importance is not limited thereto. Further, the value of the high-speed resume level becomes larger as the degree of emphasizing high-speed recovery is larger. However, the relationship between the degree of emphasizing high-speed recovery and the value of the high-speed resume level is not limited thereto. Further, the value of the power-off handling level becomes larger as the degree of emphasizing handling the unordinary power-off of the host 2 is larger. However, the relationship between the degree of placing a high value on handing the unordinary power-off of the host 2 and the value of the power-off handling level is not limited thereto. Hereinafter, the value of the importance may be simply written as "importance". Further, the value of the high-speed resume level may be simply written as high-speed resume level. Further, the value of the power-off handling level may be simply written as power-off handling level.

Note that, in the example of FIG. 3, the attribute information 7 is not saved. However, the attribute information 7 may be saved together with the temporary data 6.

Figure 4:
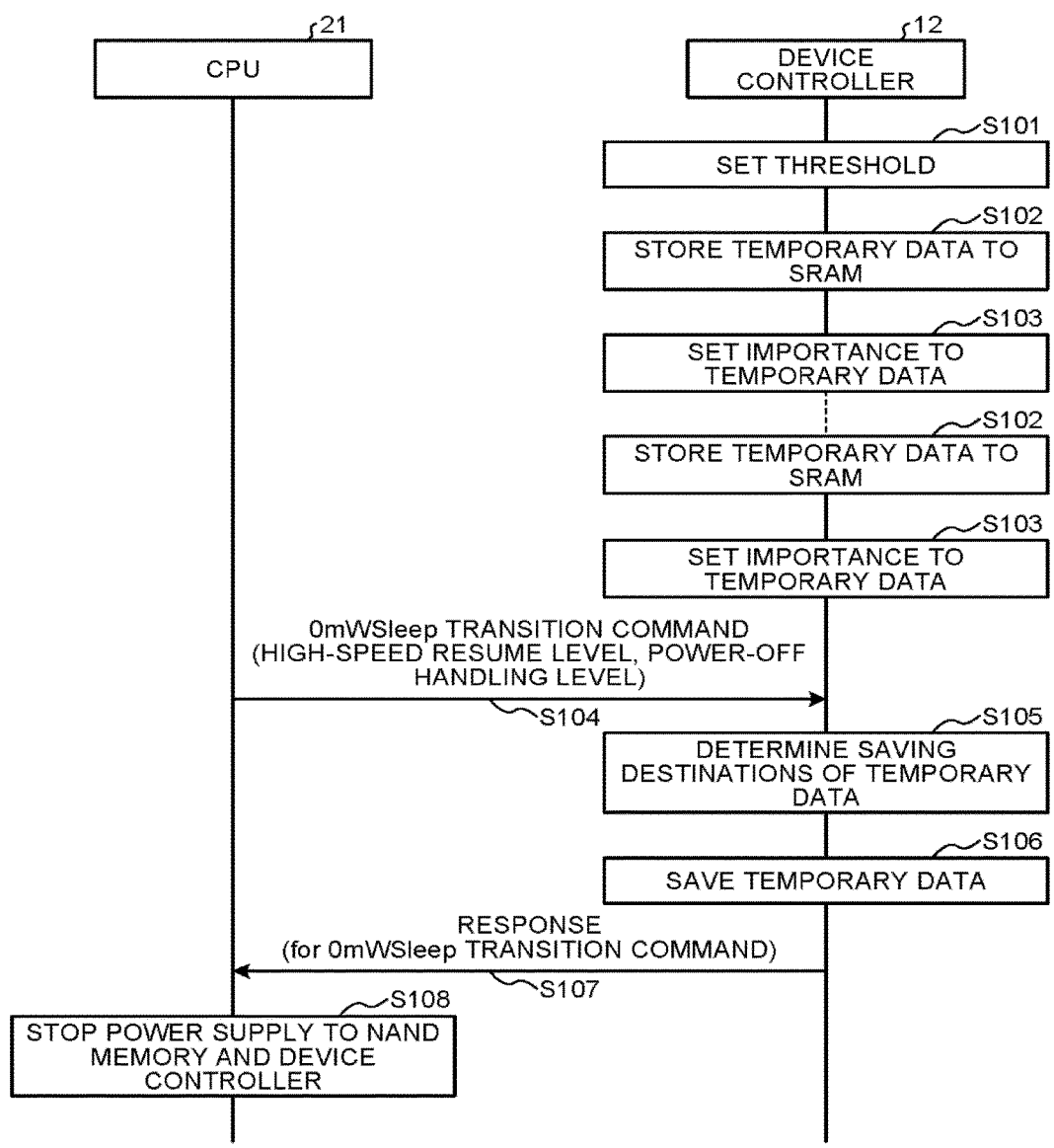
FIG. 4 is a sequence diagram illustrating an operation of the memory system of the first embodiment regarding a transition to the 0mWSleep mode.

FIG. 4 is a sequence diagram illustrating an operation of the memory system 1 of the first embodiment regarding a transition to the 0mWSleep mode.

The device controller 12 sets a threshold in the normal operation mode (S101). The threshold is a value used for comparison with the importance in determining the saving destination (S105 below).

When the device controller 12 stores the temporary data 6 to the SRAM 121 (S102), the device controller 12 sets the importance to the temporary data 6 (S103). Setting the importance to the temporary data 6 means determining the value of the importance of the temporary data 6, and adding the determined value of the importance to the temporary data 6 as the attribute information 7. The device controller 12 sets the importance to the temporary data 6 every time storing the temporary data 6 to the SRAM 121.

The CPU 21 issues the 0mWSleep transition command through the host controller 23, and the device controller 12 receives the 0mWSleep transition command (S104). The 0mWSleep transition command includes the high-speed resume level and the power-off handling level as arguments. Note that the high-speed resume level and the power-off handling level may be transmitted from the host 2 to the device controller 12 with a command different from the 0mWSleep transition command.

Upon receipt of the 0mWSleep transition command, the device controller 12 executes determination of the saving destinations of the temporary data 6 in the SRAM 121 (S105).

Figure 5:
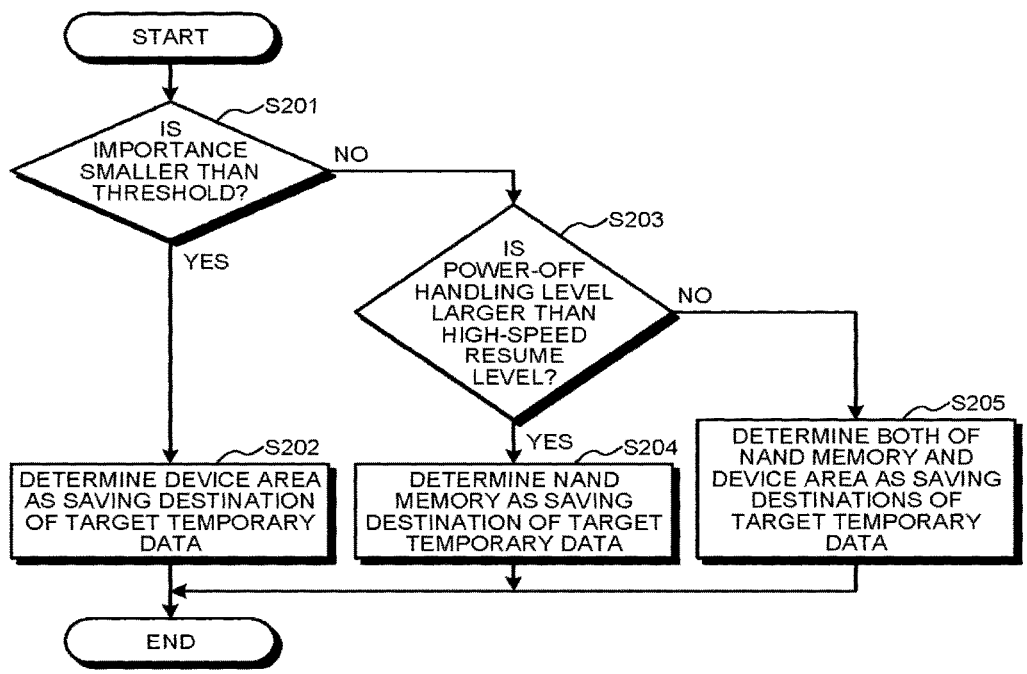
FIG. 5 is a flowchart illustrating an example of an operation of the memory system of the first embodiment in determining saving destinations of temporary data in an SRAM.

FIG. 5 is a flowchart illustrating an example of an operation of the memory system 1 of the first embodiment in determining the saving destinations of the temporary data 6 in the SRAM 121. In FIG. 5, determination of the saving destination regarding one temporary data 6 will be described. The temporary data 6 to be determined is written as target temporary data 6. In a case where a plurality of temporary data 6 is stored in the SRAM 121, the processing of FIG. 5 is executed for each of the plurality of temporary data 6 stored in the SRAM 121.

First, the device controller 12 compares the threshold and the importance of the target temporary data 6, and determines whether the importance is smaller than the threshold (S201). When the importance is smaller than the threshold (S201, Yes), the device controller 12 determines that the saving destination of the target temporary data 6 is the device area 222 (S202), and terminates the determination of the saving destination regarding the target temporary data 6.

When the importance is not smaller than the threshold (S201, No), the device controller 12 compares the high-speed resume level and the power-off handling level, and determines whether the power-off handling level is larger than the high-speed resume level (S203). When the power-off handling level is larger than the high-speed resume level (S203, Yes), the device controller 12 determines that the saving destination of the target temporary data 6 is the NAND memory 11 (S204), and terminates the determination of the saving destination regarding the target temporary data 6.

When the power-off handling level is not larger than the high-speed resume level (S203, No), the device controller 12 determines that the saving destination of the target temporary data 6 is both of the NAND memory 11 and the device area 222 (S205), and terminates the determination of the saving destination regarding the target temporary data 6.

When the threshold and the importance of the target temporary data 6 are equal in the determination processing of S201, the device controller 12 may execute the processing of S202. Further, when the power-off handling level and the high-speed resume level are equal in the determination processing of S203, the device controller 12 may execute the processing of S204.

Referring back to FIG. 4. After executing the determination of the saving destinations of the respective temporary data 6 (S105), the device controller 12 saves the temporary data 6 to the determined saving destinations (S106). Upon completion of saving of all of the temporary data 6, the device controller 12 transmits a 0mWSleep transition command response, which is a response for the 0mWSleep transition command, to the host 2 (S107).

The host controller 23 notifies the CPU 21 of the 0mWSleep transition command response. The CPU 21 can recognize that preparation of a transition of the power mode has been completed upon the 0mWSleep transition command response. After receiving the 0mWSleep transition command response, the CPU 21 controls the power supply circuit 4 and the power supply circuit 5, and stops the power supply to the NAND memory 11 and the device controller 12 (S108). With the processing of S108, the transition of the power mode is completed.

Figure 6:
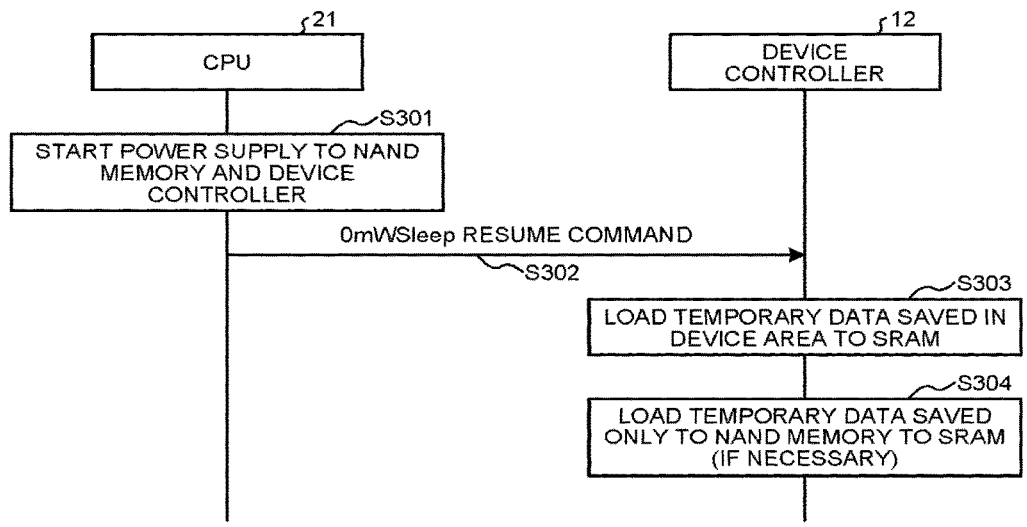
FIG. 6 is a sequence diagram illustrating an operation of the memory system of the first embodiment regarding a transition to the normal operation mode.

FIG. 6 is a sequence diagram illustrating an operation of the memory system 1 of the first embodiment regarding a transition to the normal operation mode. First, the CPU 21 starts the power supply to the NAND memory 11 and the device controller 12 (S301). Then, the CPU 21 issues a 0mWSleep resume command through the host controller 23, and the device controller 12 receives the 0mWSleep resume command (S302). Upon receipt of the 0mWSleep resume command, the device controller 12 loads the temporary data 6 saved in the device area 222 to the SRAM 121 (S303). In a case where the temporary data 6 saved only to the NAND memory 11 exists, the device controller 12 loads the temporary data 6 from the NAND memory 11 to the SRAM 121 (S304). Accordingly, the transition of the power mode is completed.

When the unordinary power-off occurs in the host 2 while the power mode of the memory system 1 is the 0mWSleep mode, and then the power mode of the memory system 1 is resumed to the normal operation mode, the CPU 21 issues an initialization command.

FIG. 7 is a sequence diagram illustrating an operation of the memory system 1 of the first embodiment when the unordinary power-off occurs in the host 2 while the power mode of the memory system 1 is the 0mWSleep mode.

First, the CPU 21 transitions the power mode of the memory system 1 from the normal operation mode to the 0mWSleep mode (S401). To be specific, processing of S401 corresponds to the processing of S104 to S108. Then, when the unordinary power-off occurs in the host 2 (S402), then the host 2 is powered on (S403), the CPU 21 starts the power supply to the NAND memory 11 and the device controller 12 (S404). The CPU 21 then issues the initialization command to the memory system 1 through the host controller 23, and the device controller 12 receives the initialization command (S405). Upon receipt of the initialization command, the device controller 12 loads the temporary data 6 saved in the NAND memory 11 to the SRAM 121 (S406). Accordingly, the transition of the power mode is completed.

As described above, according to the first embodiment, the device controller 12 saves a part of the temporary data 6 in the SRAM 121 to the device area 222 in response to the receipt of the 0mWSleep transition command, and saves another part of the temporary data 6 in the SRAM 121 to the device area 222. Accordingly, the device controller 12 can transition the power mode to the normal operation mode faster than a case where all of the temporary data 6 in the SRAM 121 are saved only to the NAND memory 11. The device controller 12 loads the temporary data 6 saved in the NAND memory 11 to the SRAM 121. Accordingly, the device controller 12 can transition the power mode to the normal operation mode without losing the important temporary data 6 even when the unordinary power-off occurs in the host 2.

Note that, in the memory system 1, the state immediately after the power mode is resumed to the normal operation mode after the unordinary power-off occurs in the host 2 during the 0mWSleep mode is not necessarily the same as the state immediately before the transition to the 0mWSleep mode. This is because the temporary data 6 saved only to the device area 222 is lost. The device controller 12 may re-construct information corresponding to the lost temporary data 6 to the SRAM 121 based on information stored in the NAND memory 11 in the past. For example, in a case where the translation table of a specific layer is saved only to the device area 222, and the translation table of the specific layer is lost, the device area 222 may re-construct the translation table of the specific layer based on the translation table of another layer stored in the NAND memory 11.

The device controller 12 receives the information for determining the saving destinations of the temporary data 6 from the host 2, and determines the saving destinations of the temporary data 6 based on the information from the host 2. Accordingly, the memory system 1 can dynamically change the saving destinations of the temporary data 6.

For example, the device controller 12 receives the high-speed resume level. The device controller 12 can change the amount of the temporary data 6 to be saved to the device area 222 between a case where the high-speed resume level is a first value and a case where the high-speed resume level is a second value that is different from the first value. To be specific, when the first value means a request of an earlier transition to the normal operation mode than the second value, the device controller 12 saves a larger number of the temporary data 6 to the device area 222 in a case where the high-speed resume level is the first value than a case where the high-speed resume level is the second value. The high-speed resume level may be binary data or a flag that indicates whether placing a high value on high-speed recovery.

Alternatively, for example, the device controller 12 receives the power-off handling level. The device controller 12 can change the amount of the temporary data 6 to be saved to the NAND memory 11 between a case where the power-off handling level is a third value and a case where the power-off handling level is a fourth value that is different from the third value. To be specific, when the third value means placing a higher value on handing the unordinary power-off of the host 2 than the fourth value, the device controller 12 saves a larger number of the temporary data 6 to the NAND memory 11 in a case where the power-off handling level is the third value than a case where the power-off handling level is the fourth value. The power-off handling level may be binary data or a flag that indicates whether placing a high value on handing the unordinary power-off of the host 2.

Alternatively, for example, the device controller 12 may change the amount of the temporary data 6 to be saved to the device area 222 or may change the amount of the temporary data 6 to be saved to the NAND memory 11, depending on a combination of the high-speed resume level and the power-off handing level, as illustrated in FIG. 5. The relationship between the high-speed resume level and the power-off handling level, and the saving destinations of the temporary data 6 is not limited to the relationship illustrated in FIG. 5. Further, as the information for determining the saving destinations from the host 2, arbitrary information can be employed.

For example, the device controller 12 may store a table where the saving destinations can be searched for from the information from the host 2 and the importance (for example, to the NAND memory 11) in advance, and determine the saving destinations of the temporary data 6 based on the table.

FIG. 8 is a diagram illustrating an example of a table for searching for the saving destinations. In the example of FIG. 8, rows of a table 111 indicate the importance, and columns of the table 111 indicate the information from the host 2. Further, in the example of FIG. 8, a request level is used as the information from the host 2. According to this table 111, the saving destinations can be determined according to the request level and the importance. Obviously, as the information from the host 2, arbitrary information is employable. A combination of the high-speed resume level and the power-off handling level is employable as the information from the host 2.

As the information from the host 2 for determining the saving destinations, information that specifies an amount or a percentage is employable. The device controller 12 may determine the NAND memory 11 (or both of the device area 222 and the NAND memory 11) as the saving destinations of the temporary data 6 of the specified amount or percentage, of the temporary data 6 in the SRAM 121. Further, when the amount or the percentage is specified, the device controller 12 may determine the NAND memory 11 (or both of the device area 222 and the NAND memory 11) as the saving destinations of the temporary data 6 in order from the temporary data 6 having the largest value of the importance.

The device controller 12 may save a part of the temporary data 6 in the SRAM 121 to both of the NAND memory 11 and the device area 222. The temporary data 6 saved to both of the NAND memory 11 and the device area 222 can be loaded to the SRAM 121 at a high speed in response to the 0mWSleep resume command, and can be loaded from the NAND memory 11 to the SRAM 121 even when the unordinary power-off of the host 2 occurs.

The device controller 12 may determine the temporary data 6 to be saved to both of the NAND memory 11 and the device area 222 based on the information from the host 2. In the flow of FIG. 5, as an example, in a case where the importance of the temporary data 6 is larger than the threshold, and the high-speed resume level is not larger than the power-off handling level, the temporary data 6 is saved to both of the NAND memory 11 and the device area 222. The method of determining the temporary data 6 to be saved to both of the NAND memory 11 and the device area 222 based on the information from the host 2 is not limited to the example of FIG. 5.

Further, the device controller 12 may specify the temporary data 6 to be saved only to the NAND memory from the host 2. The device controller 12 does not save the specified temporary data 6 to the device area 222. Accordingly, in a case of treating data to be secret, the host 2 can prevent the data to be secret from being saved to the device area 222.

Further, it has been explained that the importance is employed as the attribute information 7. However, arbitrary information other than the importance is employable as the attribute information 7. For example, information that indicates whether data is the temporary data 6 to be secret may be employed as the attribute information 7. In a case where the memory system 1 includes an encryption function, the device controller 12 stores an encryption key to the SRAM 121 as the temporary data 6 to be secret. As for the temporary data 6 to be secret, the device controller 12 determines only the NAND memory 11 as the saving destination.

The device controller 12 may determine the temporary data 6 to be saved only to the NAND memory 11 not based on the information from the host 2. For example, the device controller 12 determines the temporary data 6 to be secret as the temporary data 6 to be saved only to the NAND memory 11. Similarly, the device controller 12 may determine the temporary data 6 to be saved only to the device area 222 not based on the information from the host 2. Similarly, the device controller 12 may determine the temporary data 6 to be saved to both of the NAND memory 11 and the device area 222 not based on the information from the host 2.

In the above description, the importance has been described as the numerical parameter that indicates the degree of importance. As a technique of setting the importance, an arbitrary technique is employable. For example, a larger value is set to information to be preferentially saved. Further, for example, a larger value is set to information having a larger influence when lost. Further, for example, a large value is set to dirty temporary data 6, and a small value is set to clean temporary data 6. Clean refers to a state of the temporary data 6 stored in the NAND memory 11, the temporary data 6 having the same content as the temporary data 6 in the SRAM 121. Dirty refers to a state of the temporary data 6 not stored in the NAND memory 11, the temporary data 6 having the same content as the temporary data 6 in the SRAM 121. Further, for example, the device controller 12 may receive the value of the importance from the host 2, and set the received value of the importance to the temporary data 6. For example, in a case where the host 2 writes important user data to the memory system 1, the host 2 specifies a large value as the importance together with or separately from the write command. In storing the user data to the SRAM 121, the device controller 12 sets the specified importance from the host 2 to the user data. Further, the importance may be binary data or a flag that indicates whether data is important.

Further, setting of the importance can be executed at arbitrary timing. The device controller 12 may change the value of the importance at arbitrary timing. For example, when the state of the temporary data 6 is transitioned from the clean state to the dirty state, the device controller 12 may change the value of the importance of the temporary data 6.

As long as the attribute information 7 is recognizable for every temporary data 6, the attribute information 7 can be associated with each of the temporary data 6 by an arbitrary method. For example, the device controller 12 may manage a table that associates the temporary data 6 and the attribute information 7. Further, for example, the device controller 12 may divide an area in the SRAM 121 for every value of the attribute information 7, and store the temporary data 6 to the area in accordance with the value of the attribute information 7.

The device controller 12 may set the threshold at arbitrary timing. The device controller 12 may set the threshold during or after boot. The device controller 12 may change the threshold at arbitrary timing. The threshold may be set from an outside at the time of manufacturing or shipment. The threshold may be specified from the host 2 and the device controller 12 may set the specified threshold. As an argument of the 0mWSleep transition command, the threshold may be included.

The device controller 12 may determine the saving destinations of the temporary data 6 based on information other than the attribute information 7, the threshold, and the information from the host 2. Further, the device controller 12 may determine the saving destinations of the temporary data 6 without using any of the attribute information 7, the threshold, and the information from the host 2. The device controller 12 determines the saving destinations of the temporary data 6 in advance, and save the temporary data 6 to the saving destinations determined in advance upon receipt of the 0mWSleep transition command.

Further, the memory system 1 may be able to change the operation mode to another sleep mode, in addition to the 0mWSleep mode.

Figure 9:
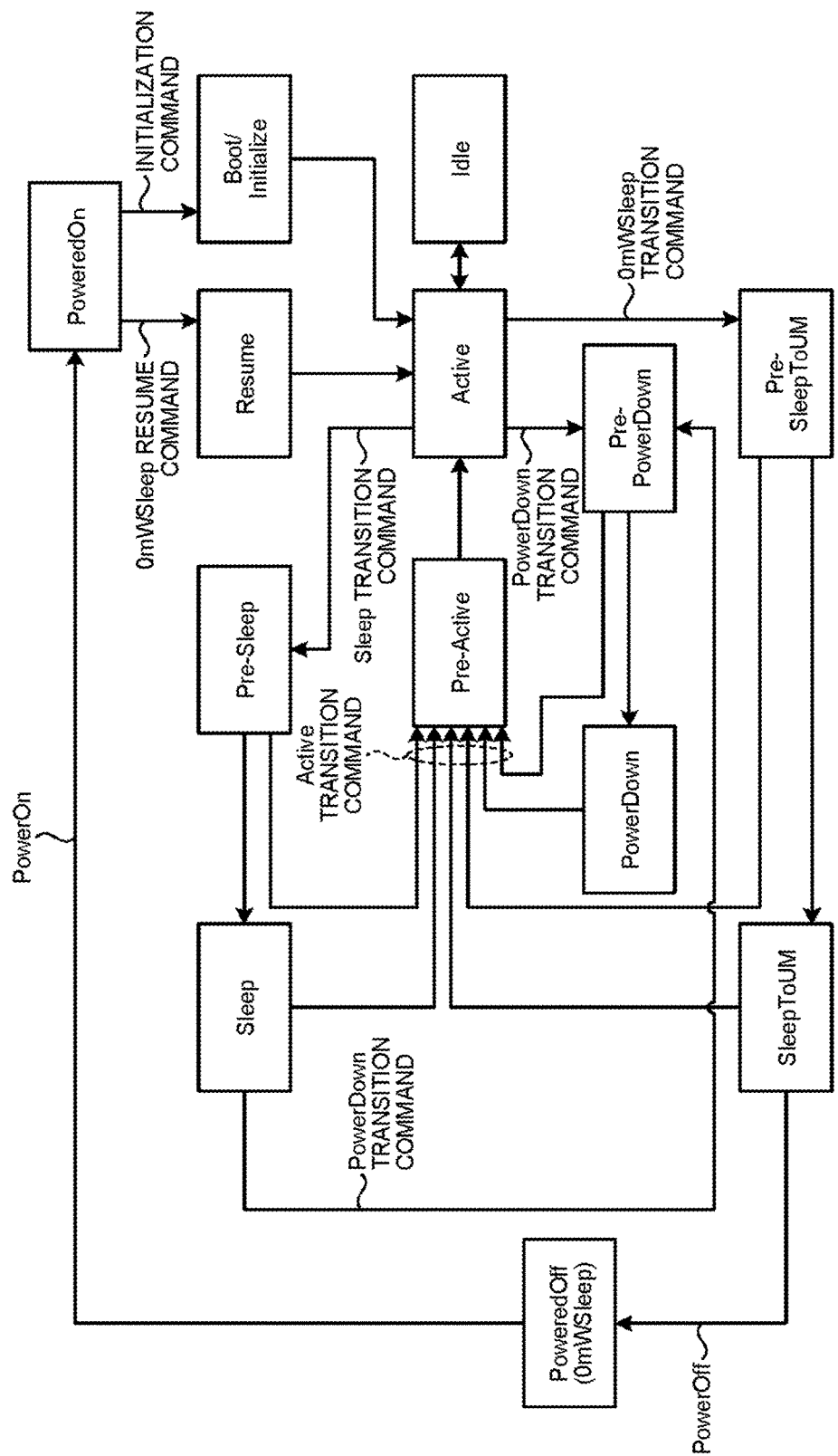
FIG. 9 is a diagram illustrating an example of a power mode group of the memory system.

FIG. 9 is a diagram illustrating an example of a power mode group of the memory system 1. An Active mode is a mode in which processing of the access command from the host 2 is being in execution, or a mode in which background processing is being in execution. The Active mode corresponds to the normal operation mode. The power mode of the memory system 1 can be transitioned from the Active mode to a Sleep mode through a Pre-Sleep mode in response to a Sleep transition command from the host 2. The Sleep mode is one of the low power consumption modes. In the Sleep mode, the memory system 1 can receive at least a Sleep resume command. That is, in the Sleep mode, the power is supplied to at least a part of the device controller 12. Therefore, the power consumption in the Sleep mode is larger than the power consumption in the 0mWSleep mode.

The power mode of the memory system 1 can be transitioned from the Active mode to a PowerDown mode through a Pre-PowerDown mode in response to a PowerDown transition command from the host 2. The PowerDown mode is a power mode to completely stop the power supply to the memory system 1. For example, in the ordinary power-off sequence, after transitioning the power mode of the memory system 1 to the PowerDown mode, the host 2 stops the power supply to the memory system 1 and the own power supply of the host 2. The Pre-PowerDown mode is a power mode to save all of necessary temporary data 6 to the NAND memory 11.

The power mode of the memory system 1 can be transitioned from the PowerDown mode to the Active mode through a Pre-Active mode in response to an Active transition command from the host 2. That is, the host 2 can transition the power mode of the memory system 1 to the Active mode in place of stopping the power supply to the memory system 1, after transitioning the power mode of the memory system 1 to the PowerDown mode. In the Pre-Active mode, the device controller 12 recovers necessary data to the SRAM 121. After completion of the recovery, the power mode of the memory system 1 is automatically transitioned from the Pre-Active mode to the Active mode. In resuming from the PowerDown mode to the Active mode, the device controller 12 recovers the temporary data 6 saved in the NAND memory 11 to the SRAM 121 in the Pre-Active mode.

The power mode of the memory system 1 can be transitioned from the Active mode to a 0MWSleep mode through a Pre-SleepToUM mode and a SleepToUM mode in response to the 0mWSleep transition command from the host 2. The device controller 12 executes the determination of the saving destinations of the temporary data 6 (S105) and the processing of saving the temporary data 6 to the determined saving destinations (S106) in the Pre-SleepToUM mode. Upon completion of the processing of S106, the power mode of the memory system 1 is transitioned to the SleepToUM mode. The SleepToUM mode is a power mode to wait for stop of the power supply. The power mode of the memory system 1 is transitioned to the 0mWSleep mode upon stop of the power supply (S108).

The power mode of the memory system 1 can be transitioned from the SleepToUM mode, the Pre-SleepToUM mode, the Sleep mode, the Pre-Sleep mode, and the Pre-PowerDown mode to the Active mode through the Pre-Active mode in response to the Active transition command from the host 2.

The power mode of the memory system 1 can be transitioned from the SleepToUM mode to the PowerDown mode through the Pre-PowerDown mode in response to the PowerDown transition command from the host 2. The device controller 12 saves the important temporary data 6 to at least the NAND memory 11 in the Pre-SleepToUM mode. Therefore, the device controller 12 may not execute the data transfer in the Pre-PowerDown mode upon receipt of the PowerDown transition command from the host 2 in the SleepToUM mode. Alternatively, the device controller 12 may transfer a part or all of the temporary data 6 saved only to the device area 222 to the NAND memory 11 in the Pre-PowerDown mode upon receipt of the PowerDown transition command from the host 2 in the SleepToUM mode.

The power mode of the memory system 1 can be transitioned from the 0mWSleep mode to a PoweredOn mode upon start of the power supply to the memory system 1 (S301). The power mode of the memory system 1 is transitioned to the Active mode through a Resume mode upon receipt of a 0mWSleep resume command in the PoweredOn mode (S302). The device controller 12 executes recovery of the temporary data 6 in the SRAM 121 in the Resume mode (S303 and S304).

The power mode of the memory system 1 can be transitioned from the PoweredOn mode to the Active mode through a Boot/Initialize mode in response to the initialization command from the host 2. In the Boot/Initialize mode, the device controller 12 loads the necessary data from the NAND memory 11 to the SRAM 121.

In a case where the host 2 is started up after the ordinary power-off sequence, the host 2 transmits the initialization command to the memory system 1. Accordingly, the device controller 12 can transition the power mode to the Active mode using the temporary data 6 saved in the NAND memory 11 in the Pre-PowerDown mode. In a case where transitioning the memory system 1 from the 0mWSleep mode to the Active mode, the host 2 transmits the 0mWSleep resume command to the memory system 1. Accordingly, the device controller 12 can transition the power mode to the Active mode using the temporary data 6 saved in the device area 222 in the Pre-SleepToUM mode.

An access speed to the NAND memory 11 may be slower than an access speed to the device area 222. In the 0mWSleep mode, a part or all of the temporary data 6 is stored in the device area 222, and thus a time to transition from the PoweredOn mode to the Active mode in response to the 0mWSleep resume command is shorter than a time to transition from the PoweredOn mode to the Active mode in response to the initialization command.

The power mode of the memory system 1 can be transitioned between the Active mode and an Idle mode. The Idle mode is a power mode in which the power to the memory system 1 is supplied similarly to the Active mode, but the memory system 1 executes no processing.

Note that the paths of the transition among the power mode group and the power modes are not limited to the description of FIG. 9. An arbitrary power mode may be added or an arbitrary power mode may be deleted. Further, an arbitrary path may be added or an arbitrary path may be deleted.

Second Embodiment

Figure 10:
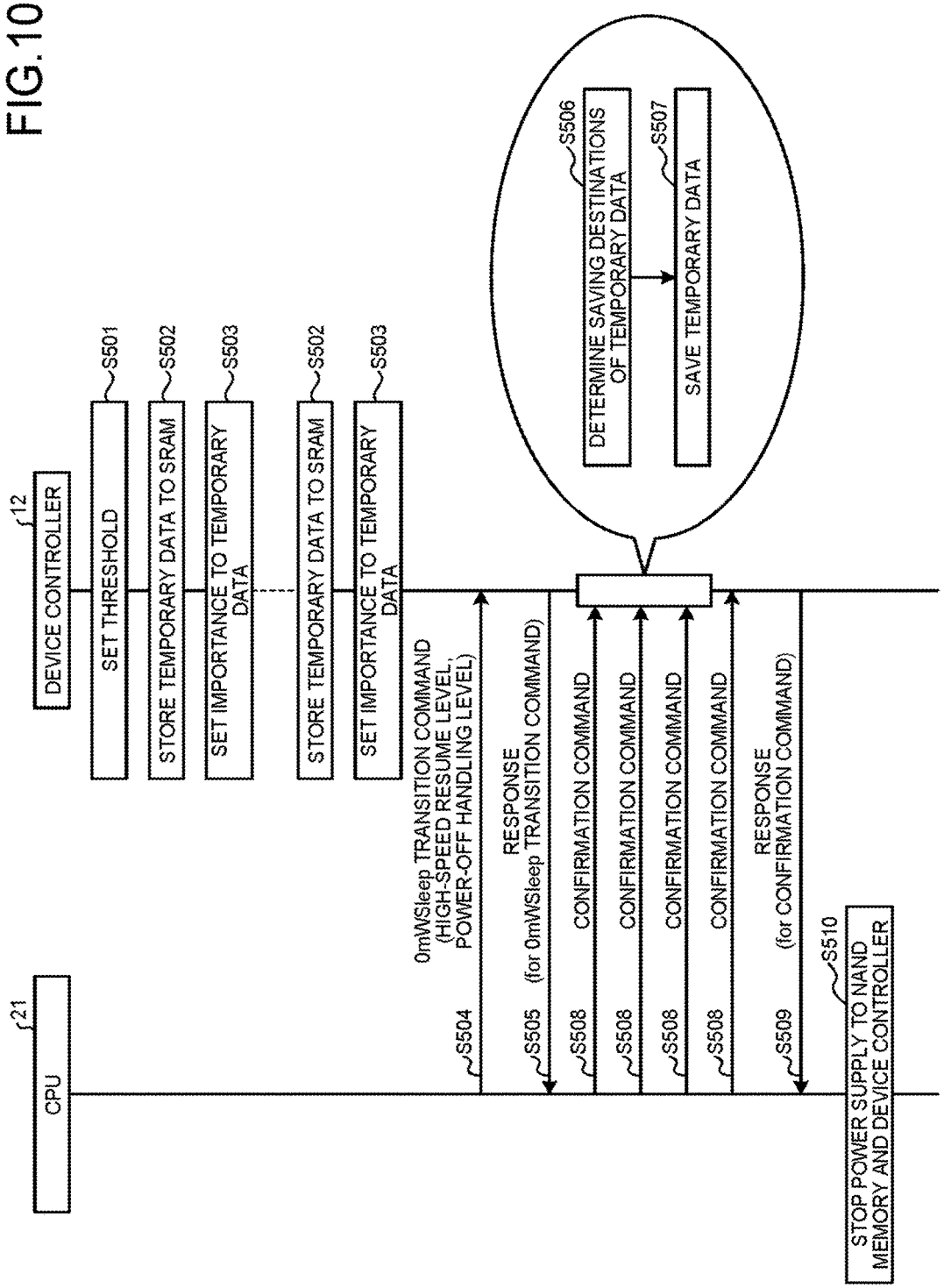
FIG. 10 is a sequence diagram illustrating an operation of a memory system of a second embodiment regarding a transition to a 0mWSleep mode.

A technique of responding to commands is not limited to a specific technique. FIG. 10 is a sequence diagram illustrating an operation of a memory system 1 of a second embodiment regarding a transition to a 0mWSleep mode.

Processing of S501 to S503 is the same as the processing of S101 to S103 of the first embodiment, and thus explanation is omitted. A CPU 21 issues a 0mWSleep transition command through a host controller 23, and a device controller 12 receives the 0mWSleep transition command (S504). The configuration of the 0mWSleep transition command is the same as that of the first embodiment, for example.

Upon receipt of the 0mWSleep transition command, the device controller 12 transmits a response of the receipt of the 0mWSleep transition command to a host 2 (S505). The host controller 23 notifies the CPU 21 of the received response. The CPU 21 recognizes that the 0mWSleep transition command has been accepted upon receipt of the response.

In the memory system 1, the device controller 12 executes determination of saving destinations of temporary data 6 in an SRAM 121 (S506) and processing of saving the temporary data 6 to the determined saving destinations (S507) after transmission of the response.

In the host 2, the CPU 21 issues a confirmation command for confirming whether saving has been completed through the host controller 23 (S508) after the receipt of the response in S505. The CPU 21 can issue the confirmation command twice or more.

The device controller 12 receives the confirmation command. When the processing of S507 has not been completed at the time of the receipt of the confirmation command, the device controller 12 does not return a response for the confirmation command. When the device controller 12 has received the confirmation command after the processing of S507 is completed, the device controller 12 returns the response for the confirmation command (S509).

The host controller 23 notifies the CPU 21 of the response for the confirmation command. The CPU 21 can recognize the completion of the saving of the temporary data 6 upon receipt of the response for the confirmation command. After the receipt of the response for the confirmation command, the CPU 21 controls a power supply circuit 4 and a power supply circuit 5 to stop power supply to a NAND memory 11 and the device controller 12 (S510). With the processing of S510, the transition of the power mode is completed.

In the second embodiment, description has been given such that the device controller 12 does not return the response for the confirmation command in a case where the device controller 12 has received the confirmation command when saving of the temporary data 6 has not been completed. The device controller 12 may return a response that indicates that the saving of the temporary data 6 has not been completed. Further, the device controller 12 may return the response indicating that the saving of the temporary data 6 has been completed when the device controller 12 has received the confirmation command after the saving of the temporary data 6 has been completed. As described above, as the technique of responding to a command, an arbitrary technique is employable.

Third Embodiment

In the first embodiment, it has been explained that all of the temporary data 6 in the SRAM 121 are saved to either the device area 222 or the NAND memory 11. All of the temporary data 6 in the SRAM 121 are not necessarily targets to be saved.

In a third embodiment, an example in which only a part of temporary data 6 in an SRAM 121 is saved will be described. As an example, here, when a device controller 12 has received a 0mWSleep transition command in a case where the device controller 12 has had a fact to execute saving of the temporary data 6 in the past, the device controller 12 omits the saving of the temporary data 6 that has had a fact to be saved in the past. The device controller 12 then executes determination of saving destinations and saving about the temporary data 6 that have not had a fact to be saved in the past.

A power mode group of a memory system 1 includes a low power consumption mode with larger power consumption than 0mWSleep. The low power consumption mode with larger power consumption than 0mWSleep is written as NormalSleep mode. For example, the Sleep mode of the power mode group illustrated in FIG. 9 corresponds to the NormalSleep mode.

Figure 11:
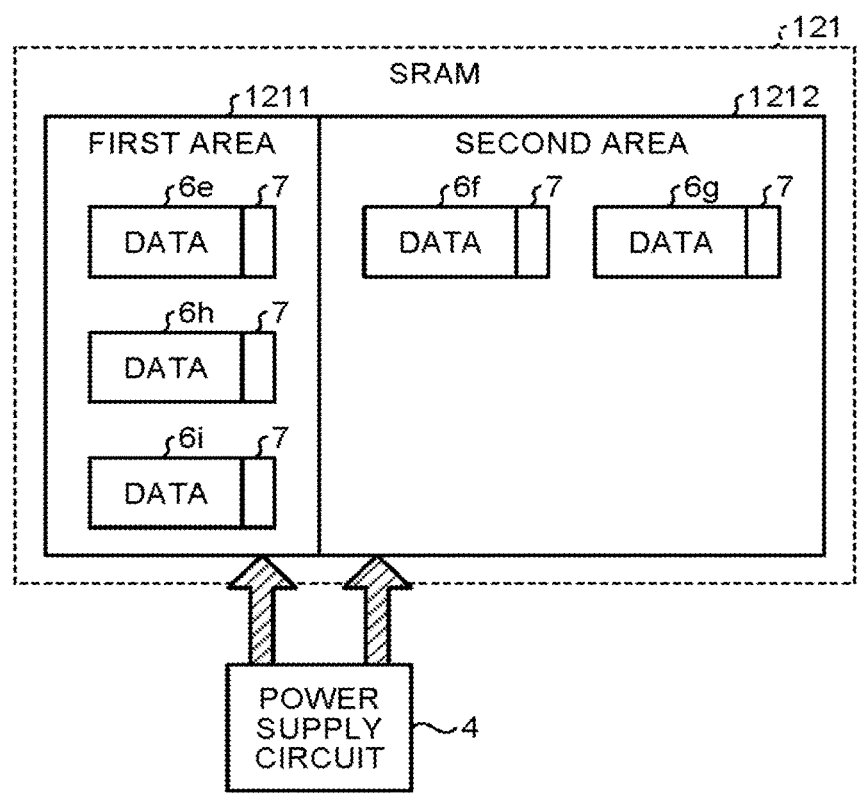
FIG. 11 is a diagram illustrating a configuration example of an SRAM of a third embodiment.

In the NormalSleep mode, at least a part of the temporary data 6 in the SRAM 121 is maintained to a usable state. FIG. 11 is a diagram illustrating a configuration example of the SRAM 121 of the third embodiment. In the third embodiment, the SRAM 121 is divided into a first area 1211 and a second area 1212. The power supply circuit 4 can individually supply power to the first area 1211 and the second area 1212. In the NormalSleep mode, the power supply to the first area 1211 is kept, and no power is supplied to the second area 1212. The device controller 12 stores, in the first area 1211, at least the temporary data 6 necessary for receipt of a command in the NormalSleep mode. For example, the device controller 12 stores, to the first area 1211, a program code necessary for receipt of a command, of a program code group of a firmware program, an highest layer of a translation table, configuration information, and the like, and stores other temporary data 6 to the second area 1212. Note that the types of the temporary data 6 stored to the first area 1211 and types of the temporary data 6 stored to the second area 1212 are not limited to the above example.

When the device controller 12 has received the 0mWSleep transition command in a case where the device controller 12 has had a fact to transition the power mode to the NormalSleep mode in the past, the device controller 12 executes determination of saving destinations and saving about the temporary data 6 stored in the first area 1211, and does not execute saving about the temporary data 6 stored in the second area 1212.

Figure 12:
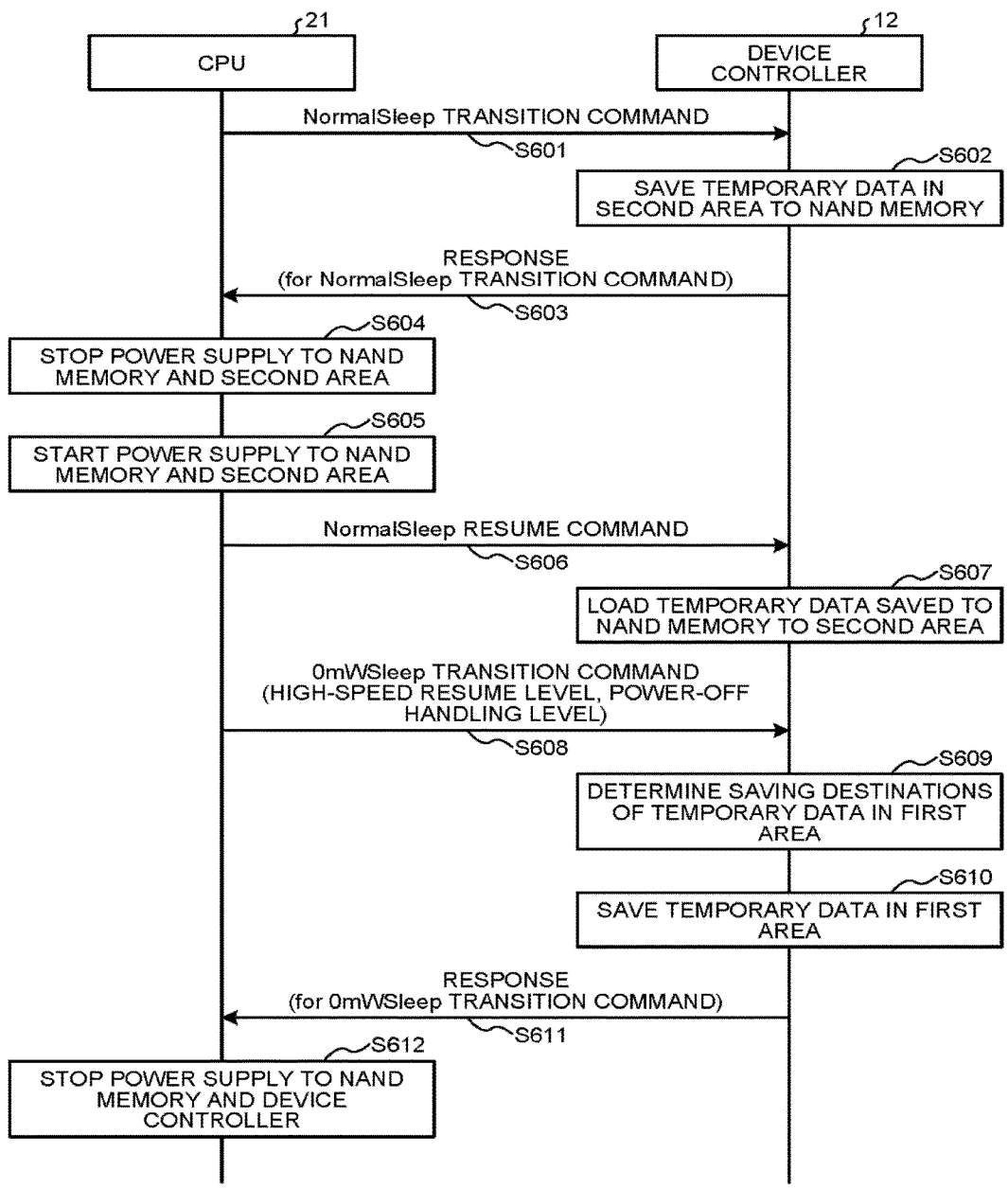
FIG. 12 is a sequence diagram illustrating an operation of a memory system of the third embodiment regarding a transition to a 0mWSleep mode.

FIG. 12 is a sequence diagram illustrating an operation of the memory system 1 of the third embodiment regarding a transition to a 0mWSleep mode.

A CPU 21 issues a NormalSleep transition command through a host controller 23 while a power mode of the memory system 1 is a normal operation mode, and the device controller 12 receives the NormalSleep transition command (S601). Upon receipt of the NormalSleep transition command, the device controller 12 saves the temporary data 6 in the second area 1212 to a NAND memory 11

(S602). Upon completion of the processing of S602, the device controller 12 transmits a response for the NormalSleep transition command to a host 2 (S603).

Upon receipt of the response, the CPU 21 stops the power supply to the NAND memory 11 and the second area 1212 (S604). Accordingly, the transition from the normal operation mode to the NormalSleep mode is completed.

Next, the CPU 21 starts the power supply to the NAND memory 11 and the second area 1212 (S605), and issues a NormalSleep resume command through the host controller 23 (S606). The device controller 12 receives the NormalSleep resume command.

Upon receipt of the NormalSleep resume command, the device controller 12 loads the temporary data saved to the NAND memory 11 to the second area 1212 (S607). Accordingly, the transition from the NormalSleep mode to the normal operation mode is completed.

Next, the CPU 21 issues a 0mWSleep transition command through the host controller 23, and the device controller 12 receives the 0mWSleep transition command (S608). The configuration of the 0mWSleep transition command may be, for example, the same as the 0mWSleep transition command of the first embodiment. Upon receipt of the 0mWSleep transition command, the device controller 12 executes determination of saving destinations of the temporary data 6 in the first area 1211 (S609) and processing of saving the temporary data 6 in the first area 1211 to the determined saving destinations (S610).

After completion of the processing of S610, the device controller 12 transmits a response for the 0mWSleep transition command to the host 2 (S611). Upon receipt of the response, the CPU 21 stops the power supply to the device controller 12 and the NAND memory 11 (S612). Accordingly, the transition from the normal operation mode to the 0mWSleep mode is completed.

In the above description, an example of the transition from the NormalSleep mode to the 0mWSleep mode through the normal operation mode has been explained. The memory system 1 may be configured to be able to directly transition from the NormalSleep mode to the 0mWSleep mode without through the normal operation mode. In that case, the device controller 12 executes the determination (S609) of the saving destinations for the temporary data 6 in the first area 1211, to which the power supply is not stopped in the NormalSleep mode. In a case where the temporary data 6 in the first area 1211 includes the temporary data 6 having the saving destination that is NAND memory 11, the device controller 12 may request the host 2 to start the power supply to the NAND memory 11. The device controller 12 can save the temporary data 6 in the first area 1211 to the NAND memory 11 to which the power supply has been started.

Further, the device controller 12 may execute the determination of the saving destination and the saving regarding a part of the temporary data 6 in the SRAM 121, regardless of whether the temporary data 6 has been saved in the NormalSleep mode in the past. For example, the device controller 12 does not treat clean temporary data 6 as a target of determination of the saving destination and a target to be saved. Alternatively, the device controller 12 treats data having a characteristic of being updated (a translation table, user data, or the like) as an target of determination of the saving destinations and an target to be saved, and does not treat data having a characteristic of being not updated (for example, a program code of a firmware program) as an target of determination of the saving destination and antarget to be saved.

As described above, according to the third embodiment, the device controller 12 executes the determination of the saving destination and the saving regarding the part of the temporary data 6 in the SRAM 121.

Fourth Embodiment

According to a fourth embodiment, a device controller 12 measures the frequency of receipt of a 0mWSleep transition command. Then, when the frequency of receipt of the 0mWSleep transition command satisfies a condition set in advance, the device controller 12 executes determination of a saving destination. When the frequency of receipt of the 0mWSleep transition command does not satisfy the above-described condition, the device controller 12 saves all of temporary data 6 in an SRAM 121 only to a device area 222 in response to the 0mWSleep transition command.

The frequency of receipt is the number of times of receipt in a past predetermined period (one hour, one day, one week, one year, or the like). In this case, the device controller 12 records a time when the device controller 12 has received the 0mWSleep transition command. Then, the device controller 12 counts the number of times of receipt within the past predetermined period, and executes determination of the saving destination when a count value satisfies the condition. The condition is that the count value exceeds a predetermined value, for example.

Further, the frequency of receipt is a total number of times of receipt from reference timing, for example. In that case, the device controller 12 includes a counter that counts the number of times of receipt of at least the 0mWSleep transition command. When the count value from the reference timing exceeds the predetermined value, the device controller 12 executes the determination of the saving destination. Note that the reference timing is a predetermined time in a predetermined cycle (one hour, one day, one week, one year, or the like). Further, the reference timing is timing when a host 2 executes an ordinary power-on sequence at the end. Alternatively, the reference timing is at the time of shipment. That is, the reference timing can be arbitrarily set.

Figure 13:
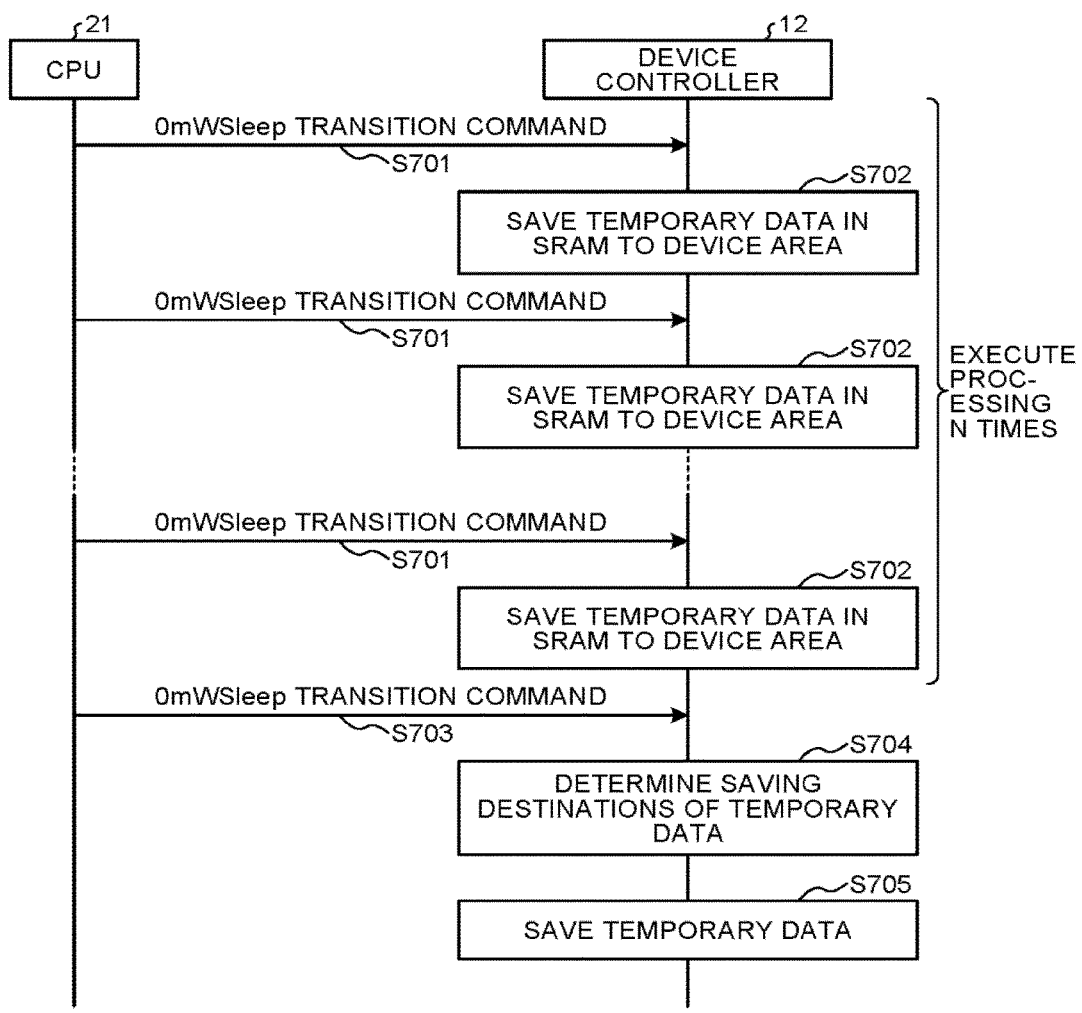
FIG. 13 is a sequence diagram illustrating an operation of a memory system of a fourth embodiment regarding a transition to a 0mWSleep mode.

FIG. 13 is a sequence diagram illustrating an operation of a memory system 1 of the fourth embodiment regarding a transition to a 0mWSleep mode. Here, explanation of transmission of a response by the device controller 12 and control of power supply by the host 2 is omitted. Further, explanation of a transition of a power mode of the memory system 1 to a mode other than the 0mWSleep mode is omitted. Further, here, receipt of the 0mWSleep transition command N times (N is an integer of 2 or more) is a condition to execute the determination of the saving destination.

The CPU 21 issues the 0mWSleep transition command through a host controller 23, and the device controller 12 receives the 0mWSleep transition command (S701). The 0mWSleep transition command may not include a high-speed resume level and a power-off handling level. Upon receipt of the 0mWSleep transition command, the device controller 12 saves all of the temporary data 6 in the SRAM 121 to the device area 222 (S702). During an operation of the host 2, the processing of S701 and S702 is executed a plurality of times. Then, after the processing of S701 and S702 is executed N times, when the device controller 12 has received the 0mWSleep transition command (S703), the device controller 12 executes determination of the saving destinations of the temporary data 6 in the SRAM 121 (S704) and processing of saving the temporary data 6 in the SRAM 121 to the determined saving destinations (S705).

The device controller 12 can execute the determination of the saving destinations (S704) by an arbitrary method, similarly to the first embodiment. The device controller 12 may determine the saving destinations according to the flow described in FIG. 5. The host 2 may specify an amount or a percentage, and the device controller 12 may determine a NAND memory 11 or both of the device area 222 and the NAND memory 11 as the saving destinations of the temporary data 6 of the specified amount or percentage, of the temporary data 6 in the SRAM 121.

As described above, according to the fourth embodiment, the device controller 12 measures the frequency of receipt of the 0mWSleep transition command. When the frequency of receipt does not satisfy a condition, the device controller 12 saves all of the temporary data 6 in the SRAM 121, the temporary data 6 being targets to be saved, to the device area 222. When the frequency of receipt satisfies the condition, the device controller 12 selects the saving destinations of the temporary data 6 in the SRAM 121, the temporary data 6 being the targets to be saved, from the NAND memory 11 and the device area 222.

Note that only a part of the temporary data 6 in the SRAM 121 may be a target to be saved, similarly to the third embodiment. That is, when the frequency of receipt of the 0mWSleep transition command does not satisfy the condition, the device controller 12 may save only the part of the temporary data 6 only to the device area 222, and may not save other temporary data 6 to both of the NAND memory 11 and the device area 222.

Fifth Embodiment

In a fifth embodiment, a device controller 12 saves all of temporary data in an SRAM 121 to both of a device area 222 and a NAND memory 11, in response to a 0mWSleep transition command.

Figure 14:
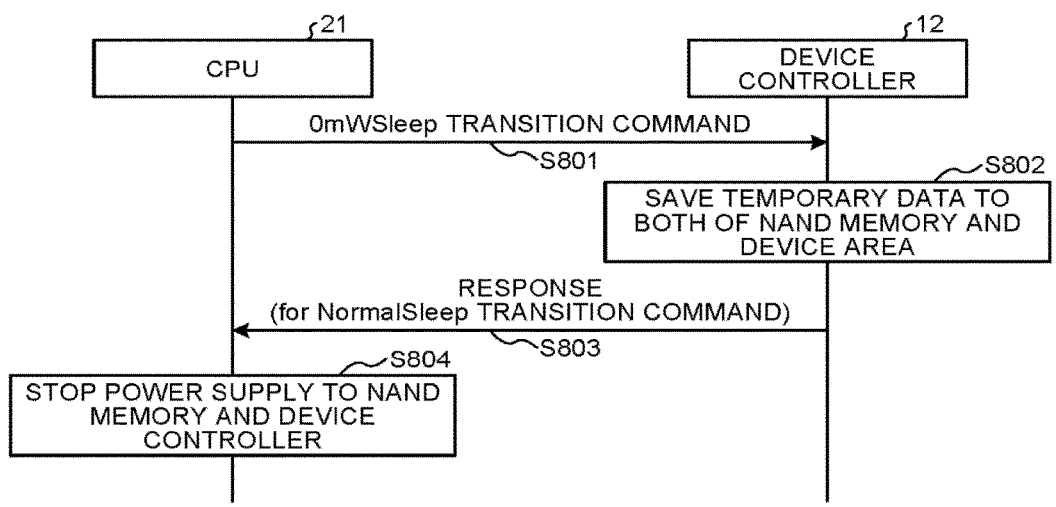
FIG. 14 is a sequence diagram illustrating an operation of a memory system of a fifth embodiment regarding a transition to a 0mWSleep mode.

FIG. 14 is a sequence diagram illustrating an operation of a memory system 1 of the fifth embodiment regarding a transition to a 0mWSleep mode.

First, a CPU 21 issues a 0mWSleep transition command through a host controller 23, and the device controller 12 receives the 0mWSleep transition command (S801). The 0mWSleep transition command may not include a high-speed resume level and a power-off handling level as arguments.

Upon receipt of the 0mWSleep transition command, the device controller 12 saves temporary data 6 in the SRAM 121 to both of the device area 222 and the NAND memory 11 (S802). Upon completion of saving of all of the temporary data 6, the device controller 12 transmits a response for the 0mWSleep transition command to a host 2 (S803).

The host controller 23 notifies the CPU 21 of the response. The CPU 21 can recognize that preparation of a transition of a power mode has been completed by the response. After receipt of the response, the CPU 21 controls a power supply circuit 4 and a power supply circuit 5, and stops power supply to the NAND memory 11 and the device controller 12 (S804). With the processing of S804, the transition of the power mode is completed.

A host 2 can use a 0mWSleep resume command after starting the power supply in a case of resuming the power mode of the memory system 1 from the 0mWSleep mode to a normal operation mode. Upon receipt of the 0mWSleep resume command, the device controller 12 loads, from the device area 222 to the SRAM 121, all of the temporary data 6 stored in the SRAM 121 immediately before transitioning the power mode to the 0mWSleep mode. The device controller 12 can load all of the temporary data 6 from the device area 222, and thus the memory system 1 can resume the operation mode to the normal operation mode at a high speed.

Further, when the host 2 is powered on when unordinary power-off occurs in the host 2 while the power mode of the memory system 1 is the 0mWSleep mode, the host 2 can use an initialization command. Upon receipt of the initialization command, the device controller 12 loads, from the NAND memory 11 to the SRAM 121, all of the temporary data 6 stored in the SRAM 121 immediately before transitioning the power mode to the 0mWSleep mode. That is, even when the unordinary power-off occurs in the host 2 while the power mode of the memory system 1 is the 0mWSleep mode, all of the temporary data 6 stored in the SRAM 121 immediately before transitioning the power mode to the 0mWSleep mode can be recovered in the SRAM 121. Therefore, reliability of the memory system 1 is improved.

Note that only a part of the temporary data 6 in the SRAM 121 may be the target to be saved, similarly to the third embodiment. That is, the device controller 12 may save only the part of the temporary data 6 to both of the device area 222 and the NAND memory 11, and may not save other temporary data 6 to either of the NAND memory 11 and the device area 222.

As described above, according to the fifth embodiment, the device controller 12 saves all of the temporary data 6 in the SRAM 121, the temporary data 6 being the targets to be saved, to both of the NAND memory 11 and the device area 222. Accordingly, when the unordinary power-off does not occur in the host 2, the memory system 1 can resume the power mode to the normal operation mode at a high speed by using the temporary data 6 saved in the device area 222. Further, when the unordinary power-off occurs in the host 2, the memory system 1 can perform normal start-up by using the temporary data 6 saved in the NAND memory 11.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host including a first memory, the memory system comprising:
   a non-volatile second memory;
   a volatile third memory; and
   a controller that uses the third memory as a work memory, and executes data transfer between the host and the second memory, wherein
   the controller receives a first command to change a power mode from the host, transfers first data to the first memory and transfers second data to the second memory in response to the receipt of the first command, and transmits a response of completion of data transfer, the first data and the second data being included in third data, the third data being data in the third memory, wherein
   after the controller transmits the response, power supply to the second memory and power supply to the third memory are stopped by the host, wherein the controller receives a second command or a third command after power supply to the second memory and power supply to the third memory are started, the controller loads the first data in the first memory to the third memory, and second data in the second memory to the third memory, in a case the controller has received the second command, and the controller loads the second data in the second memory to the third memory, in a case the controller has received the third command.

2. The memory system according to claim 1, wherein
the controller receives information from the host, and determines the first data and the second data among the third data based on the information.

3. The memory system according to claim 2, wherein
the controller determines a first amount of data as the first data in a case where the information is a first value, and determines a second amount of data as the first data in a case where the information is a second value that is different from the first value, the second amount being larger than the first amount.

4. The memory system according to claim 2, wherein
the controller determines a first amount of data as the second data in a case where the information is a first value, and determines a second amount of data as the second data in a case where the information is a second value that is different from the first value, the second amount being larger than the first amount.

5. The memory system according to claim 1, wherein
the second data includes fourth data, and the controller transfers the fourth data to both of the first memory and the second memory in response to the receipt of the first command.

6. The memory system according to claim 5, wherein
the controller receives information from the host, and determines the fourth data among the second data based on the information.

7. The memory system according to claim 1, wherein
the controller determines the first data and the second data among the third data based on importance.

8. The memory system according to claim 1, wherein
the controller receives, from the host, information that specifies fourth data among the second data, and transfers the fourth data only to the second memory in response to the receipt of the first command.

9. The memory system according to claim 1, wherein
the third data includes fourth data, and the controller does not transfer the fourth data to either of the first memory and the second memory in response to the receipt of the first command.

10. The memory system according to claim 9, wherein
the fourth data is data transferred before the receipt of the first command.

11. The memory system according to claim 1, wherein
the controller measures frequency of receipt of the first command, transfers the first data and the second data to the first memory in a case where the frequency of receipt does not satisfy a condition, and transfers the first data to the first memory and transfers the second data to the second memory in a case where the frequency of receipt satisfies the condition.

12. The memory system according to claim 1, wherein
the first data includes fourth data, the controller transfers the fourth data to both of the first memory and the second memory in response to the receipt of the first command, and the controller loads the second data and the fourth data in the second memory to the third memory in a case of the controller has received the third command.

13. A memory system connectable to a host including a first memory, the memory system comprising:
a non-volatile second memory;
a volatile third memory; and
a controller that uses the third memory as a work memory, and executes data transfer between the host and the second memory, wherein the controller receives a first command to change a power mode from the host, transfers first data to both of the first memory and the second memory in response to the receipt of the first command, and does not transfer second data to either of the first memory and the second memory in response to the receipt of the first command, the first data is one part of data being in the third memory, the second data is the other part of the data being in the third memory.

14. The memory system according to claim 13, wherein
power supply to the second memory and power supply to the third memory are stopped by the host after the controller completes the data transfer.

15. The memory system according to claim 14, wherein
the controller receives a second command or a third command after the power supply to the second memory and the power supply to the third memory are started, the controller loads the first data in the first memory to the third memory in a case where the controller has received the second command, and the controller loads the first data in the second memory to the third memory in a case where the controller has received the third command.

16. A memory system connectable to a host including a first memory, the memory system comprising:
a non-volatile second memory;
a volatile third memory; and
a controller that uses the third memory as a work memory, and executes data transfer between the host and the second memory, wherein the controller receives a first command to change a power mode from the host, transfers first data to the first memory and transfers second data to the second memory in response to the receipt of the first command, and transmits a response of completion of data transfer, the first data and the second data being included in third data, the third data being data in the third memory, wherein the first command includes an argument, and
the controller determines the first data and the second data among the third data based on the argument.

17. The memory system according to claim 16, wherein
the controller determines a first amount of data as the first data in a case where the argument is a first value, and determines a second amount of data as the first data in a case where the argument is a second value that is different from the first value, the second amount being larger than the first amount.

18. The memory system according to claim 16, wherein
the controller determines a first amount of data as the second data in a case where the argument is a first value, and determines a second amount of data as the second data in a case where the argument is a second value that is different from the first value, the second amount being larger than the first amount.

19. The memory system according to claim 16, wherein
the second data includes fourth data, and
the controller transfers the fourth data to both of the first
   memory and the second memory in response to the
   receipt of the first command.

20. The memory system according to claim 19, wherein
the controller determines the fourth data among the second data based on the argument.

* * * * *